Patented Apr. 13, 1937

2,076,706

UNITED STATES PATENT OFFICE 2,076,706

ACYLAMINOARYL PHENYLCINCHONINATES AND THE PREPARATION THEREOF

Walter G. Christiansen, Glen Ridge, N. J., and Sidney E. Harris, Lynbrook, N. Y., assignors to E. R. Squibb & Sons, New York, N. Y., a corporation of New York No Drawing. Application March 18, 1932, Serial No. 599,842

4 Claims. (Cl. 260—39)

This invention relates to, and has for its object the provision of, the compounds acylaminoaryl phenylcinchoninates and an advantageous method of preparing them.

In the practice of this invention, acylaminoaryl phenylcinchoninates are prepared by converting phenylcinchoninic acid into the acyl halide, substituting a nitroaryloxy group for the halogen, reducing the nitro group to an amino group, and acylating the amino group. Preferably, the phenylcinchoninic acid is converted into the acyl chloride by means of phosphorus oxychloride, the nitroaryloxy group is substituted for the chlorine by means of a nitrophenol, the nitro group is reduced to an amino group by means of hydrogen and platinum oxide catalyst or by means of ferrous sulfate and ammonium hydroxide, and the amino group is acylated by means of an acid anhydride.

As an example, to prepare p-acetylaminophenyl phenylcinchoninate, a suspension of 20 g. of phenylcinchoninic acid and 11.2 g. of p-nitrophenol in 500 cc. of benzol is heated to boiling while mechanically agitated; 6.2 g. of phosphorus oxychloride is added; the solution is refluxed about five hours, until hydrochloric acid ceases to be evolved; the benzol is distilled off; the residue is treated several times with boiling water to remove p-nitrophenol and acid and then with a dilute solution of sodium bicarbonate to dissolve any unchanged phenylcinchoninic acid; and the mass is washed with water until the washings become colorless, dried, and purified by precipitation from chloroform by means of absolute alcohol. The p-nitrophenyl ester of phenylcinchoninic acid so obtained is a faintly yellow powder melting at between 155.5° and 156° C.

Reduction of the nitro ester may be accomplished by either of the following processes: (a) A suspension of 2 g. of the nitro ester and .1 g. of platinum oxide catalyst (Adams and Shriner, Organic Synthesis, vol. 8, p. 92) in 100 cc. of glacial acetic acid is shaken for an hour with hydrogen at a pressure of two atmospheres. On filtering off the catalyst and adding 500 cc. of water, there is obtained a yellow emulsion from which, by scratching the vessel with a glass rod and stirring vigorously, minute yellow crystals may be caused to deposit. (b) A suspension of 2 g. of the nitro ester in 250 cc. of water containing 50 g. of ferrous sulfate is heated to boiling; a slight excess of ammonium hydroxide is added; ebullition is continued for six hours and is followed by filtration and washing; and the dried filter cake is repeatedly extracted with boiling absolute alcohol. Yellow crystals are deposited by the extracts when cool.

On recrystallization from alcohol, the amino ester melts at between 195° and 196° C.

To 1 g. of the amino ester, 5 cc. of acetic anhydride is added, the mixture is warmed for a few minutes and treated with water, the aqueous layer is decanted off, and the precipitate is washed with water. Recrystallization from alcohol yields the desired compound

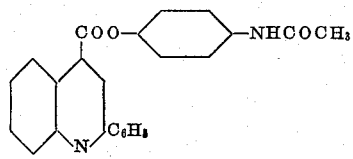

in the form of needles melting at between 185° and 186.5° C.

This compound has given evidence of utility as an analgesic.

It is to be understood that the foregoing embodiment is merely illustrative and not limitative of the invention, which may assume various other forms—for instance, as to the particular aryls and acyls introduced and the reactants, proportions, and procedures employed—within the scope of the appended claims.

We claim:

1. Compounds having the general formula

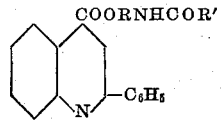

wherein R represents an aryl of the benzene series and R' represents a lower alkyl.

2. The compound acetylaminophenyl alpha-phenylcinchoninate.

3. The compound p-acetylaminophenyl alpha-phenylcinchoninate.

4. The method of preparing acetylaminophenyl alphaphenylcinchoninate that comprises treating phenylcinchoninic acid with nitrophenol, adding phosphorus oxychloride while heating, treating with ferrous sulfate and ammonium hydroxide, with heat, and treating with acetic anhydride.

WALTER G. CHRISTIANSEN.
SIDNEY E. HARRIS.